United States Patent
Utaka (10) Patent No.: US 8,772,996 B2
(45) Date of Patent: Jul. 8, 2014

(54) STATOR FOR ELECTRIC ROTATING MACHINE

(75) Inventor: Ryosuke Utaka, Takahama (JP)

(73) Assignee: Denso Corporation, Kariya (JP)

( * ) Notice: Subject to any disclaimer, the term of this patent is extended or adjusted under 35 U.S.C. 154(b) by 514 days.

(21) Appl. No.: 13/090,372

(22) Filed: Apr. 20, 2011

(65) Prior Publication Data

US 2011/0260563 A1 Oct. 27, 2011

(30) Foreign Application Priority Data

Apr. 21, 2010 (JP) ................................. 2010-097937

(51) Int. Cl.
*H02K 3/12* (2006.01)
*H02K 3/28* (2006.01)
*H02K 15/04* (2006.01)

(52) U.S. Cl.
CPC . *H02K 3/12* (2013.01); *H02K 15/04* (2013.01)
USPC ........................................................ 310/201

(58) Field of Classification Search
USPC ........................................................ 310/201
See application file for complete search history.

(56) References Cited

U.S. PATENT DOCUMENTS

| | | | |
|---|---|---|---|
| 6,388,358 B1 * | 5/2002 | Umeda et al. ................. | 310/201 |
| 6,515,392 B2 * | 2/2003 | Ooiwa .......................... | 310/179 |
| 6,930,425 B2 * | 8/2005 | Kato ............................. | 310/201 |
| 6,990,724 B2 * | 1/2006 | Tamura et al. ................. | 29/596 |
| 7,005,773 B2 * | 2/2006 | Nakamura ..................... | 310/180 |
| 7,086,136 B2 * | 8/2006 | Gorohata et al. ............... | 29/596 |
| 7,726,007 B2 * | 6/2010 | Kato et al. ...................... | 29/598 |
| 2003/0233747 A1 | 12/2003 | Gorohata et al. | |
| 2004/0041491 A1 | 3/2004 | Gorohata et al. | |

FOREIGN PATENT DOCUMENTS

| | | |
|---|---|---|
| JP | 2000-166148 | 6/2000 |
| JP | 2004-032882 | 1/2004 |

OTHER PUBLICATIONS

Office Action (6 pgs.) dated May 21, 2013 issued in corresponding Chinese Application No. 201110108297.X with an at least partial English-language translation thereof (8 pgs.).
Office Action (2 pgs.) issued Nov. 21, 2013 in corresponding Japanese Application No. 2010-097937 with an at east partial English-language translation thereof (2 pgs.).

* cited by examiner

*Primary Examiner* — Tran Nguyen
(74) *Attorney, Agent, or Firm* — Nixon & Vanderhye P.C.

(57) ABSTRACT

A stator for an electric rotating machine is provided which includes a stator winding made up of a plurality of conductor segments. Each of the conductor segments has a leg which includes an in-slot portion into one of slots of a stator core and a protrusive end extending outside the slot. The protrusive ends of the conductor segments are welded together to form a stator winding. The conductor segments are broken down into first conductor segments and second conductor segments. The protrusive ends of the first and second conductor segments include outwardly-oriented bends and inwardly-oriented bends for increasing an interval between every pair of adjacent two of the protrusive ends to be welded, thus ensuring a required degree of electrical insulation between the pairs of the protrusive ends and permits the height of a coil end of the stator winding to be decreased.

6 Claims, 5 Drawing Sheets

STATOR FOR ELECTRIC ROTATING MACHINE

CROSS REFERENCE TO RELATED DOCUMENT

The present application claims the benefit of priority of Japanese Patent Application No. 2010-97937 filed on Apr. 21, 2010, the disclosure of which is incorporated herein by reference.

BACKGROUND OF THE INVENTION

1. Technical Field

The present invention relates generally to a stator of an electric rotating machine to be mounted in for example, automotive vehicles and a production method thereof.

2. Background Art

Japanese Patent First Publication No. 2004-32882 (corresponding to U.S. Pat. No. 6,833,648 B2, assigned to the same assignee as that of this application) discloses a stator winding which extends through slots formed in a stator core. The stator winding is made up of a plurality of U-shaped conductor segments. Each of the conductor segments has two legs inserted into two of the slots of the stator core. Ends of the legs of each of the U-shaped conductor segments extend outside the slots. The ends of the legs of one of the U-shaped conductor segments are welded to those of another of the U-shaped conductor segments to make the stator winding.

The ends of the legs of the U-shaped conductor segments, as described above, extend outside the slots to make a first coil end lying on one of opposed end surfaces of the stator core in a circumferential direction of the stator core. Each of the U-shaped conductor segments has a head also called a turn portion) connecting between the legs. The heads of the U-shaped conductor segments are arrayed outside the other of the end surfaces of the stator core to make a second coil end extending in the circumferential direction of the stator core. Portions of the legs of each of the U-shaped conductor segments are disposed in the slots of the stator core and will also be referred to as in-slot portions below.

Figure 5:
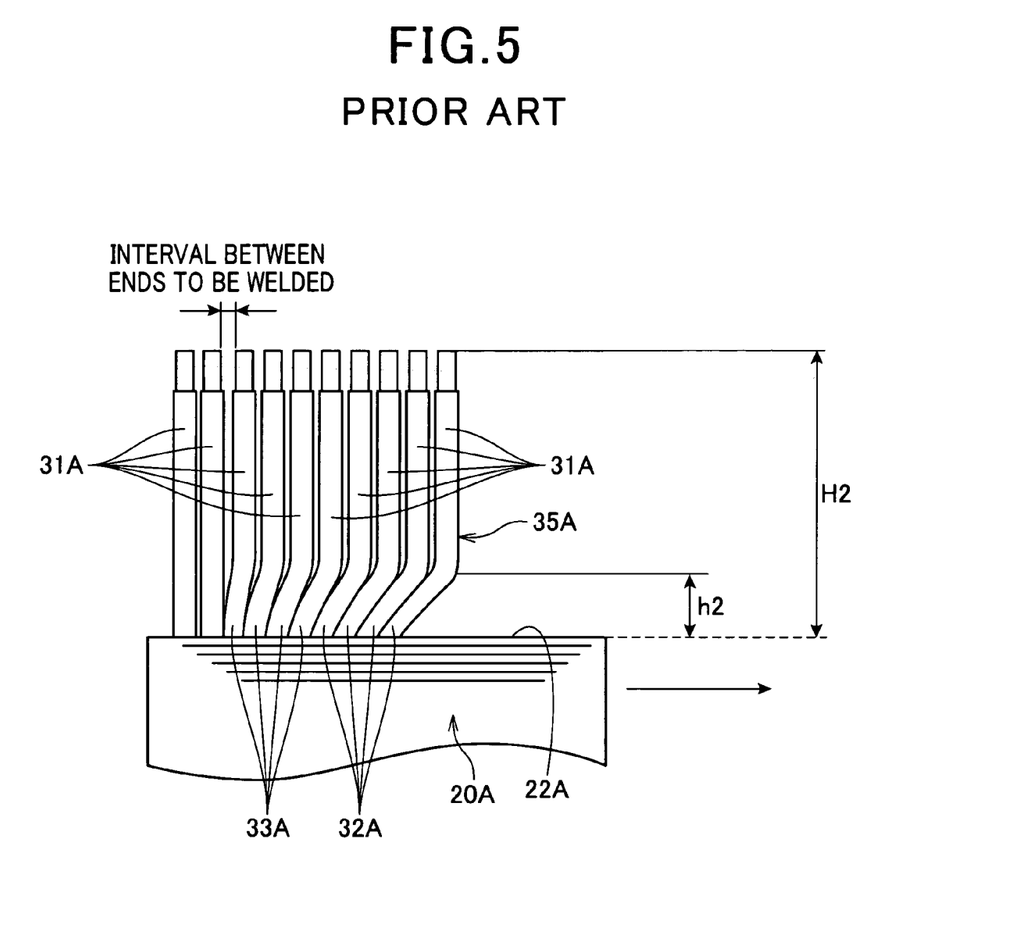
FIG. 5 is a partially side view of ends of conductor segments of a prior art stator.

The above type of stator winding in which the ends of the conductor segments are welded together outside the end surface of the stator core needs to separate the ends from one another to ensure a required degree of electrical insulation therebetween. To this end, the ends of the legs of the conductor segments extending outside the end surface of the stator core may be, as illustrated in FIG. 5, bent outward. Specifically the ends of some of the conductor segments 31A have bends 32A oriented outward in a radal direction of the stator core 20A.

Of the ten ends (i.e., five pairs to be welded) of the legs of the conductor segments 31A, two which are located most radially inward of the stator core 20A extend straight upward without any bends. The eight remaining ends have the outward bends 32A. The more the ends of the conductor segments 31A are located outward of the stator core 20A, the greater the size of the bends 32A. It is, therefore, necessary to extend the outward bend 32A of one of the conductor segments 31A which is located most outwardly of the stator core 20A in the radial direction thereof far away from the end surface 22A of the stator core 20A. This results in an increase in axial height h2 of the outward bend 32A from the end surface 22A of the stator core 20A, which leads to an increase in entire axial height H2 of the first coil end 35A made up of the ends of the conductor segments 31A.

SUMMARY

It is therefore an object to provide an improved structure of a stator core of an electric rotating machine which is designed to ensure a required degree of electric insulation between ends of conductor segments to be welded and permits the height of a coil end to be decreased.

According to one aspect of an embodiment, there is provided a stator for an electric rotating machine which comprises: (a) an annular stator core which has a plurality of slots arrayed in a circumferential direction thereof; (b) a stator winding made up of a plurality of conductor segments, each of the conductor segments having a leg which includes an in-slot portion within one of slots of the stator core and a protrusive end extending outside the one of the slots, the protrusive ends of the conductor segments being welded together to form the stator winding; (c) first conductor segments that are at least two of the conductor segments, the first conductor segments having the in-slot portions disposed in one of the slots radially outwardly of the stator core, each of the protrusive ends of the first conductor segments including an outwardly-oriented bend, as defined by a portion of the protrusive end which extends more outwardly of the stator core than the in-slot portion; and (d) second conductor segments that are at least two of the conductor segments. The second conductor segments have the in-slot portions disposed in one of the slots radially inwardly of the stator core. Each of the protrusive ends of the second conductor segments includes an inwardly-oriented bend, as defined by a portion of the protrusive end which extends more inwardly of the stator core than the in-slot portion.

Specifically, the protrusive ends of the first conductor segments deviate from the in-slot portions thereof outwardly of the stator core, while the protrusive ends of the second conductor segments deviate from the in-slot portions thereof inwardly of the stator core. In other words, the protrusive ends of the first conductor segments are located away from those of the second conductor segments in opposite radial directions of the stator core, thereby increasing an interval between every adjacent two of the protrusive ends to be welded and also permitting the height of a coil end of the stator to be decreased.

In the preferred mode, the stator further includes third conductor segments that are at least two of the conductor segments. The third conductor segments have the in-slot portions disposed in the one of the slots between those of the first conductor segments and those of the second conductor segments. The protrusive ends of the third conductor segments extending straight without any bends. This enables the bends of the first and second conductor segments to be formed in advance and also permits the first and second conductor segments to be inserted into one of the slots, after which the third conductor segments are inserted between the first and second conductor segments, thus facilitating the ease of arrangement of the conductor segments in the slots.

The six or more protrusive ends of the first, second, and third conductor segments extend outside one of the slots of the stator core. This enables the conductor segments inserted into each of the slots to be paired as being to be welded.

The outwardly-oriented bends and the inwardly-oriented bends of the first and second conductor segments arrayed in the one of the slots are symmetrical in configuration in a radial direction of the stator core. This permits a total amount by which the protrusive ends of the first conductor segments deviate from the in-slot portions thereof to be identical with that by which the protrusive ends of the second conductor segments deviate from the in-slot portions thereof and also permits the height of the outwardly-oriented bends and the inwardly-oriented bends from an end surface of the stator core in the axial direction of the stator core to be decreased.

The more radially outward the first conductor segments are located in the one of the slots, the greater an amount (which will also be referred to as a bent amount below) by which the protrusive ends of the first conductor segments deviate from the in-slot portions thereof outwardly in the radial direction of the stator core. In other words, the bent amount of an innermost one of the first conductor segments is the smallest. This permits the height of the outwardly-oriented bends to be decreased.

The more the second conductor segments are located in the one of the slots radially inwardly of the stator core, the greater an amount by which the protrusive ends of the second conductor segments deviate from the in-slot portions thereof inwardly in the radial direction of the stator core. In other words, the bent amount of an innermost one of the second conductor segments is the smallest. This permits the height of the inwardly-oriented bends to be decreased.

According to another aspect of the embodiment, there is provided a production method of a stator for an electric rotating machine. The stator includes an annular stator core which has a plurality of slots arrayed in a circumferential direction thereof and a stator winding made up of a plurality of conductor segments. Each of the conductor segments has a leg which includes an in-slot portion within one of slots of the stator core and a protrusive end extending outside the one of the slots. The protrusive ends of the conductor segments are welded together to form the stator winding. The method comprises: preparing first conductor segments, second conductor segments, and third conductor segments, each of the first and second conductor segments having a leg with a bent portion, each of the third conductor segments having a leg extending straight; inserting the legs of the first conductor segments into one of the slots of the stator core in an axial direction of the stator core and moving the legs of the first conductor segments within the one of the slots outwardly of the stator core so that ends of the legs lie outside the one of the slots as the protrusive ends of the conductor segments, and the bend portions slant radially outwardly of the stator core; inserting the legs of the second conductor segments into the one of the slots of the stator core in the axial direction of the stator core and moving the legs of the second conductor segments away from the legs of the first conductor segments through a gap within the one of the slots inwardly of the stator core so that ends of the legs lie outside the one of the slots as the protrusive ends of the conductor segments, and the bend portions slant radially inwardly of the stator core; inserting the legs of the third conductor segments into the gap between the legs of the first and second conductor segments in the axial direction of the stator core; and welding every adjacent two of the ends of the legs extending from the one of the slots of the stator core.

In the preferred mode, the six or more protrusive ends of the first, second, and third conductor segments extend outside one of the slots of the stator core.

The bent portions of the first and second conductor segments arrayed in the one of the slots are symmetrical in configuration in a radial direction of the stator core.

The more the first conductor segments are located in the one of the slots radially outwardly of the stator core, the greater an amount by which the protrusive ends of the first conductor segments deviate from the in-slot portions thereof outwardly in the radial direction of the stator core.

The more the second conductor segments are located in the one of the slots radially inwardly of the stator core, the greater an amount by which the protrusive ends of the second conductor segments deviate from the in-slot portions thereof inwardly in the radial direction of the stator core.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENT

Figure 1:
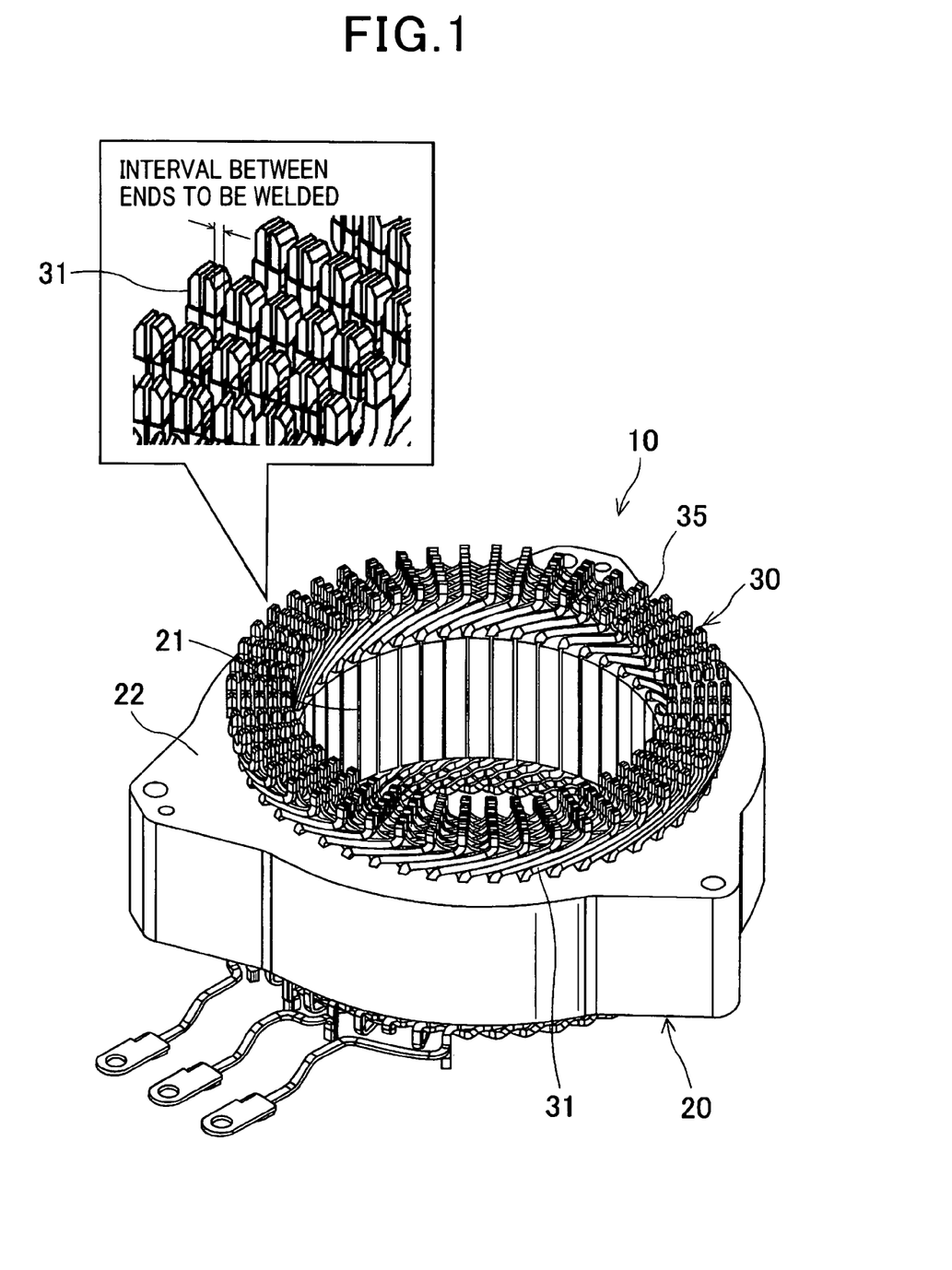
FIG. 1 is a perspective view which illustrates arrays of welded ends of a plurality of conductors segments disposed in an annular core of a stator according to an embodiment of the invention.
Figure 2:
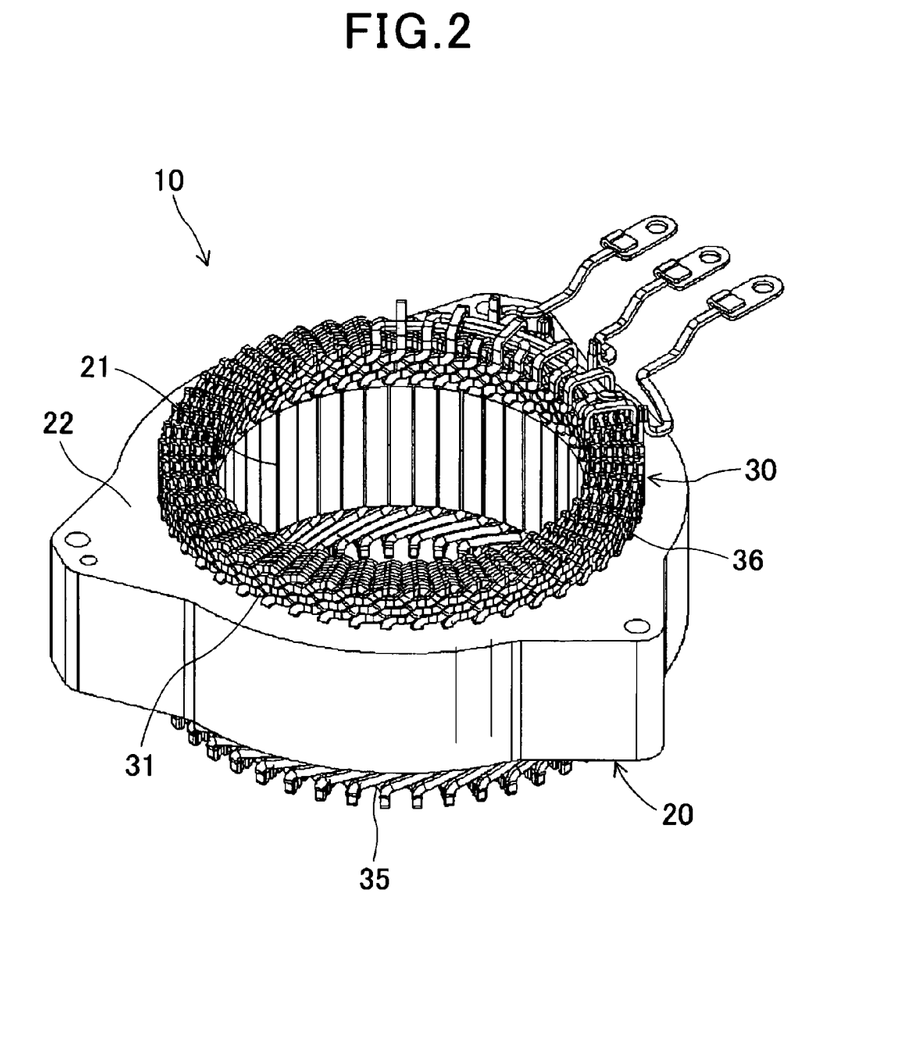
FIG. 2 is a perspective view which illustrates arrays of heads of a plurality of conductors segments disposed in an annular core of a stator according to an embodiment of the invention.

Referring to the drawings, wherein like reference numbers refer to like parts in several views, particularly to FIGS. 1 and 2, there is shown a stator 10 of an electric rotating machine such as an electric motor, an electric generator, or a motor-generator.

The stator 10 includes, as illustrated in FIGS. 1 and 2, a stator core 20 and a three-phase winding 30. The stator core 20 is of an annular shape and has a plurality of slots 21 formed in an inner periphery thereof. The slots 21 are arrayed at regular internals in a circumferential direction of the stator core 20. The three-phase winding 30 is made up of a plurality of U-shaped conductor segments 31. Each of the conductor segments 31 has a head and two legs extending from the head. Each of the conductor segments 31 is inserted into two of the slots 21 with ends of the legs, as illustrated in FIG. 1, extending outside one of opposed end surfaces of the stator core 20. Each adjacent two of the ends of the conductor segments 31 are welded together to form the three-phase winding 30. FIG. 1 illustrates circumferential arrays of the ends of the legs of the conductor segments 31 before being welded. FIG. 2 shows circumferential arrays of the heads of the conductor segments 31 on the end surface of the stator core 20.

The stator core 20 is, as described above, of an annular shape and has the slots 21 which are arrayed in the circumferential direction of the stator core 20 and open at the inner circumference of the stator core 20. The depth of each of the slots 21 is aligned with the radial direction of the stator core 20. In the case where the number of poles of a rotor of the electric rotating machine is eight (8), and the number of phases is three (3), two of the slots 31 is assigned to each of the phases and each of the poles, so that the total number of the slots 31 is forty eight (48) (=8×3×2).

Each of the conductor segments 31 is, as described above, made up of the substantially V-shaped head (which will also be referred to as a turn portion below) and the two legs extending straight from ends of the head. Each of the legs includes an in-slot portion disposed in one of the slots 21 and a protrusive end extending out of the slot 21 in the axial direction of the stator core 20. The protrusive ends are arranged on one of the end surfaces of the stator core 20 in circumferential arrays and will also be referred to as a first coil end 35 which is of an annular shape as a whole. Similarly, the heads of the conductor segments 31 are arrayed on the other end surface of the stator core 20 in circumferential arrays and will also be referred to as a second coil end 36 which is of an annular shape as a whole.

The legs of each of the conductor segments 31 are, as described above, inserted into two of the slots 21 in the axial direction of the stator core 20 with the protrusive ends extending outside the slots 21 by a given distance. The protrusive ends of the conductor segments 31 are twisted in a circumferential direction thereof by an electrical angle of approximately π/2. The protrusive ends extending from the same slot 21 are paired as being to be welded. Each of the conductor segments 31 is covered with, an insulating film except tops of the protrusive ends which are to be welded actually. After welded, the tops of the protrusive ends are coated with insulating powder.

Figure 3:
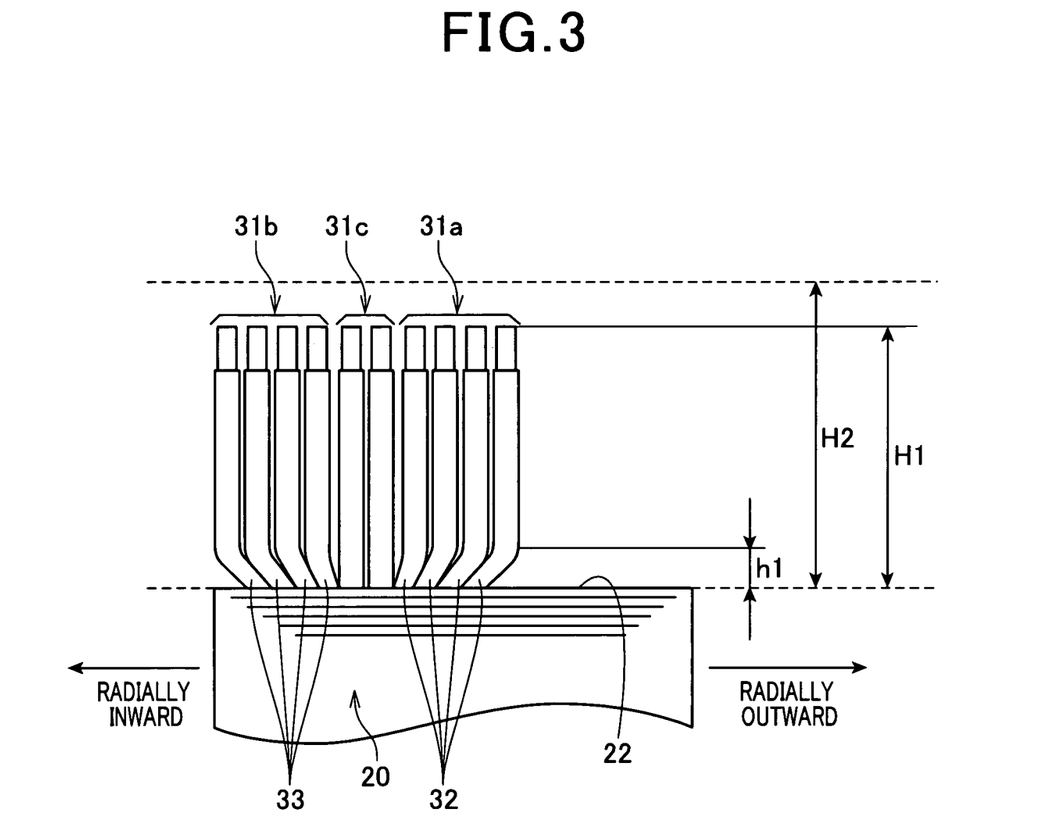
FIG. 3 is a partially side view of ends of the conductor segments extending from a slot of the annular core of the stator of FIGS. 1 and 2.

The ten protrusive ends of the conductor segments 31 extending outside each of the slots 21 are, as illustrated in FIG. 3, arrayed in the radial direction of the stator core 20 Each radially adjacent two of the protrusive ends are paired to be welded. Radially outside two of the five pairs of the protrusive ends have portions slanting from the in-slot portions obliquely outwardly of the stator core 20. Such portions will also be referred to as outward-oriented bends 32 below. The conductor segments 31 having the outward-oriented bends 32 will also be referred to as first conductor segments 31*a* below. The more outwardly of the stator core 20 the first conductor segments 31*a* are located, the greater the amount (or distance) by which the protrusive ends of the first conductor segments 31*a* deviate from the in-slot portions thereof outwardly in the radial direction of the stator core 20. Such an amount will also be referred to as a bent amount below.

Radially inside two of the five pairs of the protrusive ends of the conductor segments 31 have portions slanting from the in-slot portions obliquely inwardly of the stator core 20. Such portions will also be referred to as inward-oriented bends 33 below. The conductor segments 31 having the inward-oriented bends 33 will also be referred to as second conductor segments 31*b* below. The more the second conductor segments 31*b* are located outwardly of the stator core 20, the greater the bent amount by which the protrusive ends of the second conductor segments 31*b* deviate from the in-slot portions thereof inwardly in the radial direction of the stator core 20.

The outwardly-oriented bends 32 of the first conductor segments 31*a* and the inwardly-oriented bends 33 of the second conductor segments 31*b* are symmetrical in configuration or layout with respect to a middle one of the five pairs of the protrusive ends of the conductor segments 31 in the radial direction of the stator core 20. The bent amount of a radially outermost one of the outwardly-oriented bends 32 of the first conductor segments 31*a* is substantially identical with that of a radially innermost one of the inwardly-oriented bends 33 of the second conductor segments 31*b*.

Additionally, the bent amounts of the outwardly-oriented bends 32 of all the first conductor segments 31*a* are symmetrically equal to those of the inwardly-oriented bends 33 of all the second conductor segments 31*b*, respectively. This permits the height h1 of the outwardly-oriented bends 32 and the inwardly-oriented bends 33 from the end surface 22 of the stator core 20 to be the smallest. The height h1 may, therefore, be set smaller than the height h2, as illustrated in FIG. 5, of the bends 32A of the conductor segments 35A in the prior art structure in which the bends 32A are all oriented radially outwardly of the stator core 20A. The height H1 of the first coil end 35 may also be set smaller than the height H2 of the first coil end 35A of the prior art structure.

The two segment conductors 31 between the first and second conductor segments 31*a* and 31*b* extend straight upward from the slots 21 without any bends and will also be referred to as third conductor segments 31*c* below. As described above, a total of six or more conductor segments 31 (the four first conductor segments 31*a*, the four second conductor segments 31*b*, and the two third conductor segments 31*c* in this embodiment) are disposed in each of the slots 21 of the stator core 20.

The production method of the thus constructed stator 10 will be described below with reference to FIGS. 4(*a*) to 4(*c*).

First, the first conductor segments 31*a* with the outwardly-oriented bends 32, the second conductor segments 31*b* with the inwardly-oriented bends 33, and the third conductor segments 31*c* with the legs (i.e., the protrusive ends) extending straight are prepared.

Figure 4A:
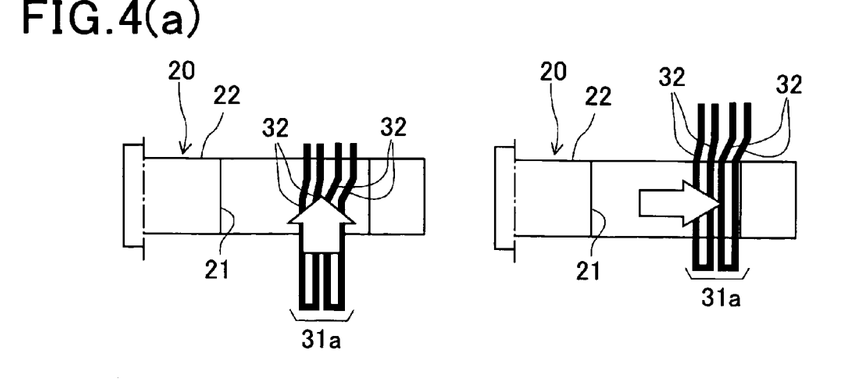
FIGS. 4(a), 4(b), and 4(c) are partially sectional views of the stator of FIGS. 1 and 2 for demonstrating a sequence of steps of inserting the conductor segments into a slot of the core of the stator.

Next, a first insertion step, as illustrated in FIG. 4(*a*), is performed to insert the four legs of the first conductor segments 31*a* into one of the slots 21 in the axial direction of the stator core 20 and then moving a combination of the legs of the first conductor segments 31*a* outwardly of the slot 21, i.e., in a direction in which the outwardly-oriented bends 32 slant. The first conductor segments 31*a*, therefore, have the in-slot portions disposed inside the slot 21 and the protrusive ends extending outside the slot 21.

Figure 4B:
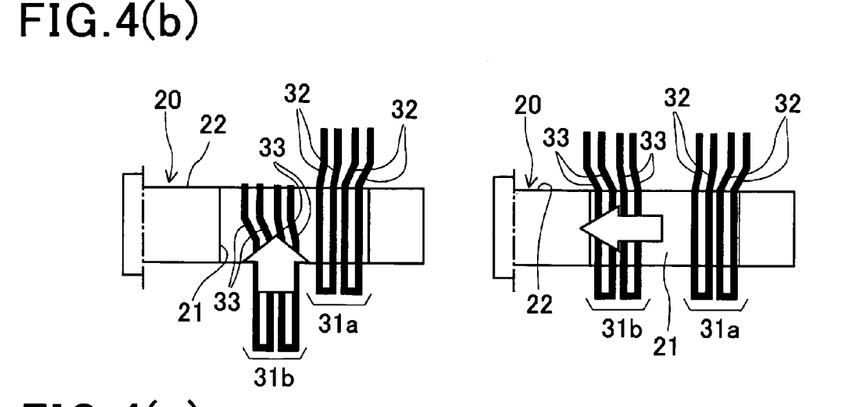

A second insertion step, as illustrated in FIG. 4(*b*), is performed to insert the four legs of the second conductor segments 31*b* into the slot 21 in the axial direction of the stator core 20 and then moving a combination of the legs of the second conductor segments 31*b* inwardly of the slot 21, i.e., in a direction in which the inwardly-oriented bends 33 slant. The second conductor segments 31*b*, therefore, have the in-slot portions disposed inside the slot 21 and the protrusive ends extending outside the slot 21. The in-slot portions of the second conductor segments 31*b* lie in the slot 21 away from those of the first conductor segments 31*a* through an air gap.

Figure 4C:
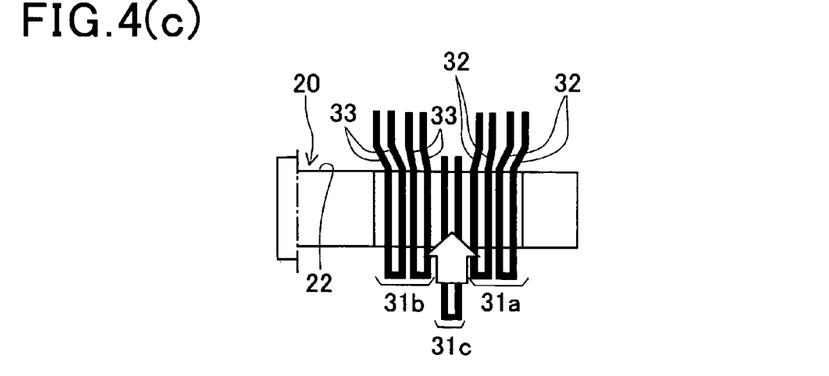

A third insertion step, as illustrated in FIG. 4(*c*), is performed to insert the two legs of the third conductor segments 31*c* into the gap between the first and second conductor segments 31*a* and 31*b*. Specifically, the third conductor segments 31*c* have the in-slot portions disposed inside the slot 21 and the protrusive ends extending outside the slot 21. Therefore, the five pairs of the conductor segments 31 are arrayed in line within the slot 21 in the radial direction of the stator core 2Q.

The above steps are performed for all the slots 21.

The protrusive ends of the first to third conductor segments 31*a*, 31*b*, and 31*c* are twisted in the circumferential direction thereof by an electrical angle of approximately π/2. Each adjacent two of the protrusive ends extending from the same slot 21 are welded to form the three-phase winding 30 extending through the slots 21 of the stator core 20, thereby completing the stator 10.

As described above, at least three pairs of the legs of the conductor segments 31 are inserted into each of the slots 21 of the stator core 20. One of the three pairs of the legs of the conductor segments 31 (i.e., the first conductor segments 31*a*) has portions (i.e., the outwardly-oriented bends 32) extending obliquely outwardly of the stator core 20. One of the three pairs of the legs of the conductor segments 31 (i.e., the second conductor segments 31b) has portions (i.e., the inwardly-oriented bends 33) extending obliquely inwardly of the stator core 20. The remaining one pair of the legs of the conductor segments 31 (i.e., the third conductor segments 31c) has the protrusive ends extending straight without any bends. In other words, at least outer two and at least inner two of the protrusive ends are bent in opposite directions. This geometrical arrangement results in an increase in interval between every adjacent two of the tops of the protrusive ends of the conductor segments 31 to be welded, thereby ensuring a desired degree of electrical insulation therebetween and also permitting the axial height h1 of the outwardly-oriented bends 32 and the inwardly-oriented bends 33 from the end surface 22 of the stator core 20 to be decreased to decrease the overall height H1 of the protrusive ends (i.e., the first coil end 35).

The conductor segments 31 are broken down into the first conductor segments 31a, the second conductor segments 31b, and the third conductor segments 31c disposed in each of the slots 21 between the first and second conductor segments 31a and 31b. The arrangement of the conductor segments 31 in each of the slots 21 is achieved easily by inserting the legs of the first and second conductor segments 31a and 31b in which the outwardly-oriented bends 32 and the inwardly-oriented bends 33 are already formed into the slot 21 and then inserting the legs of the third conductor segments 31c between the legs of the first and second conductor segments 31a and 31b.

The at least six conductor segments 31 are disposed in each of the slots 21 of the stator core 20 and paired to be welded. This enables the at least one pair of the first conductor segments 31a, the at least one pair of the second conductor segments 31b, and the at least one pair, of the third conductor segments 31c to be disposed in each of the slots 21.

The outwardly-oriented bends 32 of the first conductor segments 31a and the inwardly-oriented bends 33 of the second conductor segments 31b are symmetrical in geometry or layout with respect to the protrusive ends of the third conductor segments 31c, as viewed on a cross section of the stator 10, as taken in the radial direction of the stator core 20. This enables a total amount by which the protrusive ends of the first conductor segments 31a deviate from the in-slot portions thereof to be identical with that by which the protrusive ends of the second conductor segments 31b deviate from the in-slot portions thereof and also permits the height h1 of the outwardly-oriented bends 32 and the inwardly-oriented bends 33 from the end surface 22 of the stator core 20 in the axial direction of the stator core 20 to be decreased.

Additionally, the more the first conductor segments 31a are located outwardly of the stator core 20, the greater the bent amount by which the protrusive ends of the first conductor segments 31a deviate from the in-slot portions thereof outwardly in the radial direction of the stator core 20. In other words, the bent amount of an innermost one of the first conductor segments 31a is the smallest. This permits the height h1 of the outwardly-oriented bends 32 to be decreased, thus enabling the height H1 of the first coil end 35 to be decreased as compared with the prior art structure.

Similarly, the more the second conductor segments 31b are located inwardly of the stator core 20, the greater the bent amount by which the protrusive ends of the second conductor segments 31b deviate from the in-slot portions thereof inwardly in the radial direction of the stator core 20. In other words, the bent amount of an outermost one of the second conductor segments 31b is the smallest. This permits the height h1 of the inwardly-oriented bends 33 to be decreased, thus enabling the height H1 of the first coil end 35 to be decreased as compared with the prior art structure.

The above arrangement of the protrusive ends of the conductor segments 31 ensures a required degree of electrical insulation between every adjacent two of the tops of the protrusive ends to be welded and also permits the height H1 of the first coil end 35 to be minimized.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

The ten protrusive ends of the conductor segments 31 extend outside each of the slots 21 of the stator core 20 in the above embodiment, but the even numbers (six or more) of protrusive ends are preferably arrayed above each of the slots 21 because two of the first conductor segments 31a, two of the second conductor segments 31b, and two of the third conductor segments 31c are welded, respectively. Additionally, the number of the radially outside conductor segments needs not necessarily be identical with that of the radially inside conductor segments. In other words, the number of the first conductor segments 31a may be different from that of the second conductor segments 31b.

The conductor segments 31 are wave-wound through the slots 21 of the stator core 20 to form the stator winding 30, but may alternatively be lap-wound through the slots 21 of the stator core. The lap-winding may be achieved by changing combinations of the protrusive ends of the conductor segments 31 to be welded.

What is claimed is:

1. A stator for an electric rotating machine comprising:
    an annular stator core which has a plurality of slots arrayed in a circumferential direction thereof;
    a stator winding made up of a plurality of conductor segments, each of the conductor segments having a leg including an in-slot portion positioned within one of the slots of the stator core and a protrusive end extending outside the one of the slots, the protrusive ends of the conductor segments being welded together to form the stator winding;
    first conductor segments that are at least two of the conductor segments, the first conductor segments having the in-slot portions disposed in one of the slots radially outwardly of the stator core, each of the protrusive ends of the first conductor segments including 1) a radially outwardly-oriented bend, as defined by a portion of the protrusive end that extends more radially outwardly of the stator core than the in-slot portion and 2) a straight portion that extends away from the outwardly-oriented bend in a manner that maintains a substantially constant radial positioning relative to the stator core; and
    second conductor segments that are at least two of the conductor segments, the second conductor segments having the in-slot portions disposed in one of the slots radially inwardly of the stator core, each of the protrusive ends of the second conductor segments including 1) a radially inwardly-oriented bend, as defined by a portion of the protrusive end that extends more radially inwardly of the stator core than the in-slot portion and 2) a straight portion that extends away from the inwardly-oriented bend in a manner that maintains a substantially constant radial positioning relative to the stator core, wherein the protrusive end of each of the first conductor segments is twisted the circumferential direction of the stator core, and wherein the protrusive end of each of the second conductor segments is twisted in the circumferential direction of the stator core.

2. A stator as set forth in claim 1, further comprising third conductor segments that are at least two of the conductor segments, the third conductor segments having the in-slot portions disposed in the one of the slots between those of the first conductor segments and those of the second conductor segments, the protrusive ends of the third conductor segments extending straight without any bends.

3. A stator as set forth in claim 2, wherein the protrusive ends of the first, second, and third conductor segments extend outside one of the slots of the stator core.

4. A stator as set forth in claim 1, wherein the outwardly-oriented bends and the inwardly-oriented bends of the first and second conductor segments arrayed in the one of the slots are symmetrical in configuration in a radial direction of the stator core.

5. A stator as set forth in claim 1, wherein an amount that the protrusive ends of the first conductor segments deviate from the in-slot portions thereof outwardly in the radial direction of the stator core increases in accordance with a relative radial outward positioning of each first conductor segment in a respective one of the slots with respect to the stator core.

6. A stator as set forth in claim 1, wherein an amount that the protrusive ends of the second conductor segments deviate from the in-slot portions thereof inwardly in the radial direction of the stator core increases in accordance with a relative radial inward positioning of each second conductor segment in a respective one of the slots with respect to the stator core.

* * * * *